UNITED STATES PATENT OFFICE.

PETER HARDER, OF DANVILLE, PENNSYLVANIA.

IMPROVEMENT IN CEMENT FOR ROOFING PURPOSES.

Specification forming part of Letters Patent No. 33,194, dated September 3, 1861.

*To all whom it may concern:*

Be it known that I, PETER HARDER, of Danville, in the county of Montour and State of Pennsylvania, have invented a new and Improved Composition for Roofing; and I do hereby declare that the following is a full, clear, and exact description of the same.

The object of this invention is to produce a roofing compound of such elasticity and power to resist expansion and contraction that it will not be liable to crack when exposed to the influence of the varying temperature; and it consists of a composition made by mixing together naphtha, gum-shellac dissolved in alcohol, a solution of pure india-rubber and of asphaltum, pulverized soapstone, and boiled flaxseed-oil, as herein set forth. The proportion in which these ingredients are mixed is as follows: twenty-four gallons of naphtha or coal-tar, ten pounds of gum-shellac reduced to solution with two gallons of ninety-five per cent. alcohol, four gallons of a rubber mixture, made by dissolving four pounds of raw rubber in eight gallons of spirits of turpentine, seven pounds of asphaltum, ten pounds of soapstone, pulverized, two gallons of flaxseed-oil, boiled.

The naphtha which I use is first boiled for the purpose of expelling the water which it contains, and thereby I obviate the necessity of using artificial driers—such as sugar of lead and plaster-of-paris—which are generally used with roofing compounds containing naphtha, and which render the same brittle and liable to crack. Thus prepared the naphtha is mixed with the other ingredients in the proportion above named at a moderate heat.

It will be remarked that the quantity of india-rubber and of flaxseed-oil which I use is greater in proportion than with ordinary compositions for the same purpose. By these means the elasticity of the compound and its water-proof quality are increased, and when exposed to the influence of the weather the compound is not liable to crack by the expansion and contraction; and at the same time, by the use of the pulverized soapstone, the required consistency and firmness is produced.

In applying my compound I produce the shrinking of the canvas before it is tacked to the boards of the roof. When the canvas is tacked to the boards without this precaution, and when the composition is applied afterward, it is liable to shrink so much that the tacks are started and the roof is injured. After the canvas is well tacked to the roofing-boards I apply the first coat, giving full time to dry, when the second coat is applied, which is also left to dry, and after a third coat all the sand the composition will absorb is applied. The sand must be well washed and dried, and free from all foreign substances.

Having thus fully described my invention, what I claim as new, and desire to secure by Letters Patent, is—

The within-described roofing composition, made of naphtha, shellac, alcohol, rubber, flaxseed-oil, asphaltum, and soapstone, in the proportions and manner herein set forth.

PETER HARDER.

Witnesses:
WM. H. JOHNSTON,
N. S. RANK.